(12) United States Patent
Fakeih

(10) Patent No.: US 9,703,873 B2
(45) Date of Patent: Jul. 11, 2017

(54) LOCATING HUMAN RESOURCES VIA A COMPUTER NETWORK

(71) Applicant: Adnan Fakeih, Jeddah (SA)

(72) Inventor: Adnan Fakeih, Jeddah (SA)

( * ) Notice: Subject to any disclaimer, the term of this patent is extended or adjusted under 35 U.S.C. 154(b) by 540 days.

(21) Appl. No.: 13/873,042

(22) Filed: Apr. 29, 2013

(65) Prior Publication Data

US 2013/0304721 A1 Nov. 14, 2013

Related U.S. Application Data

(60) Provisional application No. 61/639,377, filed on Apr. 27, 2012, provisional application No. 61/732,089, filed on Nov. 30, 2012.

(51) Int. Cl.
G06F 17/30 (2006.01)

(52) U.S. Cl.
CPC .. *G06F 17/30867* (2013.01); *G06F 17/30522* (2013.01); *G06F 17/30554* (2013.01); *G06F 17/30702* (2013.01)

(58) Field of Classification Search
CPC ......... G06F 17/30867; G06F 17/30864; G06F 17/30876
USPC .............................. 707/705–780; 705/1.1–329
See application file for complete search history.

(56) References Cited

U.S. PATENT DOCUMENTS

| | | | | |
|---|---|---|---|---|
| 8,185,558 B1 * | 5/2012 | Narayanan | ........ | G06F 17/30958 707/798 |
| 8,306,970 B2 * | 11/2012 | Drubner | ............ | G06F 17/30424 702/181 |
| 8,543,441 B2 * | 9/2013 | Siegel | .................. | G06Q 10/109 455/456.1 |
| 8,589,386 B2 * | 11/2013 | Leslie | ............... | G06F 17/30991 707/722 |
| 2006/0248039 A1 * | 11/2006 | Brooks | ............. | G06F 17/30613 |
| 2008/0097979 A1 * | 4/2008 | Heidloff | ............ | G06F 17/30699 |
| 2008/0288596 A1 * | 11/2008 | Smith | .................... | G06Q 30/02 709/206 |
| 2009/0055476 A1 * | 2/2009 | Markus | .................. | G06Q 10/00 709/204 |
| 2009/0307168 A1 * | 12/2009 | Bockius | ............ | G06F 17/30867 706/46 |
| 2013/0097197 A1 * | 4/2013 | Rincover | ............ | G06F 17/3087 707/766 |
| 2013/0097237 A1 * | 4/2013 | Kothari | .................. | G06Q 50/01 709/204 |
| 2013/0179802 A1 * | 7/2013 | Martinazzi | .............. | H04L 67/22 715/753 |
| 2013/0290414 A1 * | 10/2013 | Rait | ....................... | G06Q 50/01 709/204 |

(Continued)

*Primary Examiner* — Michelle Owyang
(74) *Attorney, Agent, or Firm* — Seed IP Law Group LLP

(57) ABSTRACT

A computer implemented method for a user of a network to locate one or more human resources, the method comprising the steps of: providing a record in a database for each of a plurality of human resources, the record including one or more keywords associated with the human resource; receiving from a first user a search request including one or more keywords; searching the records in the database to find matching records associated with one or more human resources with a keyword that matches a keyword in the received search request; and returning search results to the first user, the search results identifying the matching records.

21 Claims, 6 Drawing Sheets

(56) References Cited

U.S. PATENT DOCUMENTS

| | | | |
|---|---|---|---|
| 2013/0339868 A1* | 12/2013 | Sharpe | G06F 3/04817 715/739 |
| 2014/0095303 A1* | 4/2014 | Jones | G06F 17/30867 705/14.49 |
| 2014/0218394 A1* | 8/2014 | Hochmuth | G09G 5/377 345/629 |

* cited by examiner

FIG. 2B

Search and Map Frontend- Main Page

| Profile | Notifications | Searched Items | | Logout |

Logo

Keyword: [_____] ☒ Save this search
[ Locate ] [ Find Top Users ]

Trending Keywords
Zoology          Airbus          Saudi Aramco
Stanford University   Human History   Wild dreams
Quantum Computing    Entanglement    String Theory Sticky button → [ Chat ]

Copyright Notice

---

Profile | Notifications | Searched Items

Basic | Email | Password

Country [____▽]
City [____▽]
Favorite Search Engine [____▽]
Sex ○Male ○Female
[ Update ]

---

Profile | Notifications | Searched Items

User XYZ added you as a contact  [Accept] [Reject] [Block]
User 123 added you as a contact  [Accept] [Reject] [Block]
User* added you as a contact     [Accept] [Reject] [Block]

---

Profile | Notifications | Searched Items

Basic | Email | Password

Your current email address is johnsmith@email.com
New E-mail [_____]
Password [_____]
[ Confirm ]

↓ User clicks on "Confirm"

Profile | Notifications | Searched Items

Basic | Email | Password

A verification link was sent to your new E-mail address. Please check it.
[ OK ]

---

Profile | Notifications | Searched Items

Basic | Email | Password

Current Password [_____]
New Password [_____]
Retype Password [_____]
[ Confirm ]

---

Profile | Notifications | Searched Items

Quantum Computing      ✗
Zoology                ✗
Vegetarian             ✗
Chaos Theory           ✗
3D Printers            ✗
See All...

---

Chat box page pops out when user clicks this button → [ Chat ⌕ ]

Contacts | User 123 | User XYZ | Status

User 123  Online
User XYZ  Online
User*     Busy
User^     Offline

Me: Hi
User123: Hello
Me: I need help regarding Quantum Computing
User123: sure
Me: could you please elaborate on what a qbit actually means?
User 123: Read this first: http://thisisthelink.com

[ Send ]

LOCATING HUMAN RESOURCES VIA A COMPUTER NETWORK

CROSS-REFERENCE TO RELATED APPLICATIONS

This application claims the benefit of U.S. Provisional Application No. 61/639,377, filed Apr. 27, 2012 and U.S. Provisional Application No. 61/732,089, filed Nov. 30, 2012, which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure relates to ways of locating human resources via a computer network (e.g., the Internet) from keywords or phrases associated with the human resources.

BACKGROUND

There are many search engines on the internet that are used for searching textual and pictorial information. Popular search engines include, e.g., Google®, Yahoo!®, Bing®, and the like. All popular search engines provide their results as lists of URLs (Uniform Resource Locators) for the searched keywords.

There also exist virtual networks on the internet that link people. These fall into different categories:
- Social Networks: Networks of friends or mutual acquaintances (such as Facebook® and Google+®)
- Business Networks: Connect people based on their business relations and professional contacts (such as LinkedIn®)
- Chat Rooms: These are rooms of predefined interests for discussions and debates (such as PalTalk® and Yahoo!® chat rooms)

A traditional search engine's main service is normally just to provide the searcher with a list of URLs where the keyword appears on third party websites.

A number of problems exist from a searcher's perspective. For example, although sometimes a searcher/user can get a solution to a question they are researching using their own searches of documented information on the Internet, they might obtain more knowledge or get a better result from "unwritten" experience or advice from a person (i.e., a "human resource") who has knowledge or experience in relation to the question they are researching.

SUMMARY

In general terms, this system facilitates locating human resources (i.e., people or groups of people) over a network, such as the internet, based on one or more specific keywords entered by a user. Some embodiments additionally facilitate connections between the user and the human resources they locate, for example so they can chat online or exchange messages and resources to discuss a particular area of interest. In the following, the term, "human resources," refers to an individual person or group of people. Typically, these people will be users of the network. Additionally, for simplicity, the term, "keywords," will be used to refer to "keywords" and "phrases."

Embodiments of the system comprise a database of human resources, a search engine for querying the database and, optionally, a chatting component. The database contains interests of individuals or groups of individuals (i.e., human resources), as expressed by them in terms of keywords. The database preferably also includes contact details (e.g., email addresses, social network IDs, and the like) for each human resource to facilitate contact between a user querying the database and the human resources returned by their search. The search engine receives a query and searches the database for possible matches before storing the query itself in the database with the corresponding contact address of its creator. Once the query finds one or more matching human resources, a list of those resources is returned to the user along with the matched keywords, who may then be offered a chance to communicate with the human resource(s) found by the search, for example via the chatting component where present. This gives rise to a new kind of search engine that produces what may be called HRLs (Human Resource Locators) as opposed to the standard URLs produces by current search engines.

In one variant of the system, all search queries entered in traditional internet search engines are considered keywords/phrases expressing interests of their originators. Thus, the system stores them in a database along with the contact addresses of their originators for possible networking in future runs. As soon as the query is entered, the user is notified of previous users who have entered similar queries and is thus given the opportunity of communicating with them.

In some embodiments, the system creates a network of internet searchers/users via a "Search and Map" mechanism, where the Internet user searches for a specific keyword/phrase using popular search engines (e.g., Google®, Yahoo!®, Bing®) and later can connect to other users who have searched (or are currently searching) for a similar keyword/phrase. This helps users know each other and share information based on performed searches.

One aspect of the system provides a computer-implemented method for a user of a network (e.g., the Internet) to locate one or more human resources, the method comprising the steps of:

providing a record in a database for each of a plurality of human resources, the record including one or more keywords associated with the human resource;

receiving from a first user a search request including one or more keywords;

searching the records in the database to find matching records associated with one or more human resources with a keyword that matches a keyword in the received search request; and returning search results to the first user, the search results identifying the matching records.

Each human resource record may additionally comprise contact information for the human resource. In this case, the search results returned to the first user may provide the first user with an opportunity to contact the one or more human resources using the contact information from the database records for those human resources.

The search results returned may be, in effect, a list of HRLs (Human Resource Locators).

The keywords entered by the first user to initiate the request are preferably added to the database record for the first user (who may themselves be a human resource with a record in the database). In this way the keywords associated with users in their associated human resource database records can evolve over time based on the searches that each user is conducting. Users are preferably also given the ability to amend the keywords in their human resource database record, preferably including the ability to delete and/or amend existing keywords and/or to add new keywords.

In some embodiments, the step of receiving the keywords from the first user comprises receiving keywords that the first user has entered into a search engine for the purposes of a conventional internet search.

In some embodiments a link can be created in the database between matching records to create a virtual network of human resources associated with particular matching keywords. Where such links are formed the human resources associated with the linked records are preferably notified.

In another aspect the system provides an improved Internet search engine which makes use of a database that distinguishes between human resources and material resources (e.g., documents and other files accessible via the internet). Embodiments of this aspect may make use of at least one first database for maintaining records for human resources and at least one second, separate database for indexing material resources. Alternatively, records for human resources and material resources may be maintained in the same database, wherein the database includes a flag that distinguishes human resources from material resources. A user may select to have search results returned to them that identify only human resources (e.g., a list of HRLs), only material resources (e.g., a list of URLs) or a mixture of the two.

A further aspect of the disclosed embodiments provides a system employing a method as described in the first aspect. This may take the form of a program embedded in an internet browser (e.g., a tool bar), or a dedicated web page, for example.

BRIEF DESCRIPTION OF THE DRAWINGS

An example is now described with reference to the accompanying drawings, in which:

FIGS. 2(a) to (c) show exemplary user interface layouts for steps in a process of using a system in accordance with an embodiment;

DETAILED DESCRIPTION

Figure 1:
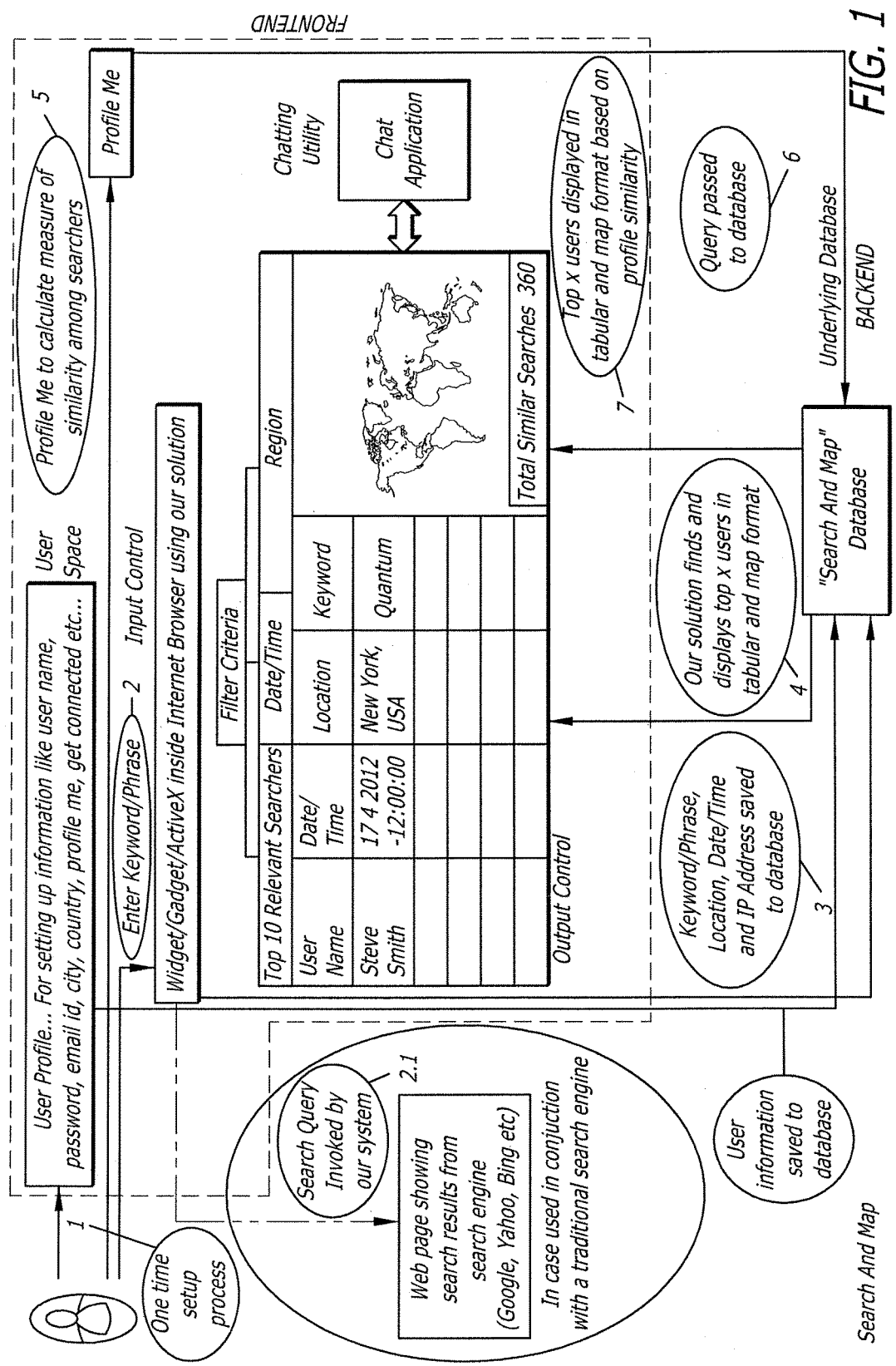
FIG. 1 shows a schematic of modules for an embodiment.

The internet is primarily used to connect users to resources. These resources usually take the form of web materials such as documents, videos, sound tracks, software, and the like (i.e., material resources). However, these resources can also take the form of humans who possess specific knowledge or interests. In the former case, the user intends to access the located resource, whereas in the latter case the user intends to communicate with it. Communicating with "previously-known" human resources (acquaintances) is a well-established service in the internet. The prevailing channel for such communication is emailing which is reported to be the number one internet activity according to recent statistics. Other ways of contacting acquaintances include social networking services such as Facebook and Google plus. Nonetheless, sometimes internet users may desire to contact humans who happen to be previously unknown to them based on interest, knowledge, expertise or even need for a one-time tip. In this situation, locating such humans through the internet is not an easy task. If the user is already a member or a forum or a discussion group then she may try to find the targeted resource from within that forum or group. However, this solution is not always useful especially if the user would like to contact people of different interests or on matters that are not directly related to the subject of interest of the concerned group or forum. Moreover, the search space in such a case will be limited to the subset of potential resources bounded by the members of the specific group/forum.

Perhaps the most comprehensive and straightforward approach for tackling this problem is using a search engine. To communicate with people who have specific interests, a searcher would usually think of a keyword (or a series of keywords) that characterizes this interest in some form in hopes that this search would generate a list of URLs containing leads to human resources who would be willing to communicate with him. These leads can be in forms of blogs, personal webpages, forums (to which members are affiliated), published resumes, Facebook pages, discussion group, and the like. However, there is no form of querying that can solely lead to URLs of this kind only. Typically, the resultant URL list does not differentiate between human resources and material resources; therefore, a mixture of both is passed on to the searcher. Any attempt of adding keywords that tell the search engine to filter human resources not only will result in an elimination of the undesired material resources, but will instead only limit the search scope. This is due to the fact that search engines locate internet resources by conducting a full text search on the documented script pertaining to those resources. Even if a search result provides a lead to a human resource such as a résumé of a person, there is no guarantee that the keywords used in the search is of a particular interest to that person; since it can be a part of a description (e.g., address) of a business entity with which he or she had a contact during their career path or for which an old manager of theirs is currently working.

It may seem that the closest available channel to locate previously unknown human resources is to use social networking services, instant messaging services or chat rooms. However, all means of expanding friends/acquaintances/ interests in these services are predefined. Friend finders are programmed by their manufacturers where the user has no option but to select from what they provide her with. Chat rooms are equally limited by providing access to only a limited segment of users with predefined interests. Even the available criteria for searching within these existing users are predefined; where the manufacturer of the site (such as Facebook®, for example) limits the filtration process by factors like age, gender and location. Since you cannot search by personalized terms (such as preferred meals, which may be nocturnal or vegetarian) or any other arbitrary sequence of keywords, this limits the search space and confines it to a sub-group of members or a sub-group of choices. Even if privacy breaching issues are resolved, and a user is indeed allowed to search the full space of other members, more confusion will arise in the search results. This is due to the mechanism of the full text search pointed out earlier. The user will always get hits that were only considered because a series of keywords happened to exist in the "wall" space of some members for any number of reasons. It is very plausible that none of these members have consciously included or allowed such a series of keywords to be on their wall; and even if they did, it is very unlikely that they would have done so for the purpose of being "found" by other members through such a searching process.

Google plus introduced "Discussions" in their search engines in October 2009. The purpose (as stated by Johanna Wright, Director of Product Management and Devin Mullins, Software Engineer, Google) was to "find forum posts or discussions related to what you're searching for." They further elaborate by saying that it is always nice to know what others are saying about a specific topic and how recent their comments are. Yet again, this service is not intended to connect you to people for the purpose of making discussion/chatting about the subject of your interest; rather, it deals with previous comments of people filtered by discussion groups and forums and uses the search engine to locate them. So once more the service targets mini documents consisting of short paragraphs commenting on a subject or an incident instead of targeting the person creating these "comments."

The problem of locating human resources on the internet is unique. It inherits its difficulty from the fact that humans are arguably free-willed entities that make varied decisions during their lifetime. Any other internet resource can be primarily classified in a category that defines its scope and puts it in its place within the global framework of human interests. The same, however, cannot be said for humans for two main reasons. The first is due to the vast number of choices and decisions humans make every day. Each decision or choice carries an experience that may, in principle, be of interest to other humans. Thus, it is very difficult, if not practically impossible, to categorize human beings in the same way one categorizes software, books, movies and other martial internet sources. The second reason is due to the fact that humans almost continually change their behavior, interests or aspirations. A ten year old boy may have a growing interest in computer games and skate boarding. The same boy five years later would probably have entirely different interests. On the contrary, the Harry Potter fiction series, for example (categorized under fiction—fantasy sub-category), is very unlikely to be categorized under a different genre within the next decade. This difference between the nature of "human" versus "material" resources warrants a new way of tackling the problem of accessing human resources over the internet. In summary, this new way has to make use of and account for the following seven points:

1. The fact that unlike material resources accessible by internet search engines, humans are free-willed entities who make an uncountable number of choices and decisions on a daily basis that may potentially be of interest to other humans; therefore, making it practically impossible to classify them using a set of categories the same way material resources are categorized.
2. The fact that unlike material resources accessible by internet search engines, humans are adaptive, aging creatures who change their interests and aspirations over time.
3. The fact that unlike material resources accessible by internet search engines, humans are living creatures who are prone to illness and death thus becoming "inaccessible" to other human beings.
4. The fact that unlike material resources accessible by internet search engines, humans may opt not to be contacted by others depending on who they are contacted by, the subject of contact, the time of contact or any other conceivable reason.
5. The fact that unlike material resources accessible by internet search engines, humans can express their interests in terms of a set of keywords.
6. The fact that unlike material resources accessible by internet search engines, humans can edit the set of keywords described in point 5 by adding more keywords to it or removing all or some of the keywords contained in it or editing them.
7. The fact that humans are and have already been expressing their interests in the same way described in point 5 when attempting to access material resources over the internet using variant search engines.

Generally, embodiments of the system address the problem of locating people over the internet as opposed to documented material (documents, videos, sound tracks, and the like) traditionally queried by current search engines. From the networking point of view, embodiments of the system themselves create and destroy links (e.g., communication channels) between users based on their list of interests (keywords); unlike what happens in traditional networking services, where the user is responsible for creating and destroying these links.

In classical user networks, it is the responsibility of the user to add or delete other users. In a user network in accordance with some embodiments this is done automatically as a user performs more searches (potentially adding more users if the searched topic is not novel—which is the usual case) or deletes certain keywords from his profile. This means that less "maintenance" is required by the user, who pays no attention to the dynamicity of the underlying network topology. If the user wants to keep permanent ties to other users, the user can revert to standard methods of communication, e.g., email.

It should be noted that this system is different from social networks, instant messaging services or chat rooms—all these share the property of "user-driven links," which means that the user always select who the user links to himself. Besides, all "expansion rules"—means of expanding the user's friends/acquaintances/interests—are predefined: "Friend finders" are programmed by their manufacturers, and the user has no option but to select from what they are provided with. Chat rooms are setup with predefined interests. Even the available criteria for searching existing users are predefined—once a manufacturer (such as Facebook®, for example) provides searching by age, gender and location, you can't search by exotic terms like preferred meals, is nocturnal or is vegetarian. Even if this set of provided search criteria grows, you are still searching what the user writes in his profile, not everything that the user has written on Facebook®—which is a different scope. In effect, some embodiments convert every search query to an "expansion rule," i.e. every search query becomes a means of locating a new user.

Some embodiments of the system address the problem of locating human resources over the internet by building a database consisting of keywords entered, edited and managed by individuals who would be willing to be contacted by others based on these keywords. Each user (i.e., human resource) would have her own editable user space that contains her profile information, contact address and the specific list of keywords by which she chooses to define herself and her interests. The system maps/matches all users (i.e., human resources) together based on their interests (the keywords existing in their space). Subsequently, the users would be offered the option to connect to others upon highlighting a keyword in their list or when entering a new keyword. The network structure (connecting users to each other) would typically be dynamically changing as users change their list of interests by removing, adding or editing a keyword in it. Whenever a user enters a new keyword, the search engine queries the database and provides her with a contact list containing direct access to other users who are interested in the same keywords. The resultant contact list is parallel to the URL list provided by traditional search engines when queried for material resources. In this regard, it can be termed an HRL (human resource locator) list.

As a concrete example of how the system may be useful, consider that Alan, a British undergraduate student, wants to transfer to Stanford University. An elegant way would be to search for (transfer Stanford University international students) and filter the results in such a way that he is left with students who have gone through a similar experience within the last year. This will enable him to communicate directly with those students who have transferred or applied for a transfer to the university within the past year to ask them for tips and advice for maximizing his chance of getting an approval. Note that he would only be connected to those users who have opted to keep the relevant keywords in their "search space" (i.e., their database record) and thus are willing to be communicated to regarding this subject.

Some embodiments can provide users with a management tool for editing and changing their preferences, and by monitoring the heartbeat of their activity over time. If the user stops using the service or interacting with it for some time, then she would be deemed unreachable and hence taken out from the network.

One way of implementing the system is to make use of current search engines. Queries passed to search engines may be considered as keywords representing interests of users. Thus the system can make use of this already existing activity to build its database, then allow users to revise and edit their lists of keywords as deemed fit.

The system can be used by any existing service such as social network services, forums or discussion groups. It can also be used by telecommunication or mobile companies that connect their users together the same way, for instance, as the Blackberry Messenger Service.

Furthermore, some embodiments archive interests for the purpose of seeding future networks. While traditional search services have a separate process for archiving documents (and other resources) for the purpose of querying, this system will have a recursive loop, feeding the query itself to the targeted database for the purpose of future queries. Imagine a person (x) wanting to start an association of European zoologists who served in Kenya during the past decade, and no information is available regarding that issue; whenever somebody else (y) thinks about the same idea, both x and y will be informed of each other and a network pertaining to the above keywords is established. This gives rise to a network seeding utility, where anybody searching for a new combination of keywords is essentially seeding a new network between those interested in the same thing.

Yet another characteristic of this system is realized as more users start making use of it. Current search engines play the role of a gateway between users and online documented information (e.g., web pages, pictures, videos, and the like). Similarly, a user network will present a gateway between users and "potential experts." The assumption is that as an individual searches the internet using, for example, a keyword like "quantum entanglement," the user gains some level of expertise on the subject. This level may be preliminarily assessed, for example, by the number of "sessions" the user has been searching using the same (or similar) keywords. A further refined level of assessment can be applied using feedback from other users once this "expert" is approached by them. So the system may finally present a new gateway, parallel to that offered by search engines, but differing from it in that it provides the user with a network of expertise knowledge residing in human minds. In a sense, this will complement the role of current search engines in giving accessibility to undocumented human knowledge and experiences, and will also provide a means that encourages people to maintain, expand and exchange their experiences in every expressible subject. Furthermore, since the knowledge pursued by this system is in the human mind, and since humans change their interests over time, the only way to maintain this knowledge is to transfer as much as possible of it to other human minds before its holder changes his interest or ceases to exist. This system provides a means for such a process where "blogs" and "pages" propagate animatedly in the human mind space of the internet users.

While it is conceivable that an internet user could use a search engine or a social network service (or any other tool such as Discussions by Google) to locate human resources over the Internet, this process would be very different than the system and method disclosed herein. For example, an architecture student who needs a private one to one tutoring on AutoCAD© or Rivet© (special software programs for architectural design) may use a search engine like Google to locate such a resource. Let's assume that the probability of having a search engine user who targets a human resource is k. In such a case, the location process usually encompasses several layers before accomplishing its mission. Since the engine does a full text search in targeted web pages, comments, posts, blogs, and the like, it can always produce two undesired outputs:

Results which pertain to material resources rather than human ones.

Results which pertain to human resources but are irrelevant to the entered query (see above).

No matter how the search process is optimized to avoid such irrelevant results, there will always be a probability of showing them, as the full text search property inherently produces such results. Let's denote this probability by p. Subsequently, if each search query on average produces an amount of internet traffic equal to f, then for each search query, again on average, there will be irrelevant internet traffic (IT) equals to:

$$IT = p \times k \times f \qquad (1.1)$$

From (1.1) the on average relevant internet traffic per search query (RT) is:

$$RT = (1-p) \times k \times f \qquad (1.2)$$

Although the RT provides URLs relevant to human resources, there will always be a probability w of having URL's amongst them that do not provide direct communication channels to those humans. To actually contact those humans, other steps are needed such as accessing a forum webpage and registering in such a forum before being able to communicate with its members. This extra step will cost extra g traffic on average per URL. The on average extra irrelevant traffic (EIT) for this scenario will then be given by:

$$EIT = (1-p) \times k \times w \times g \qquad (1.3)$$

Moreover, unlike non-human resources, people may be unwilling to be contacted; and thus, the whole search effort leads to a dead end. Assume that the probability of that happening is q; then the on-average wasted traffic (WT) in this regard will be:

$$WT = q \times (1-p) \times k \times f + q \times (1-p) \times k \times w \times g \quad (5)$$

or $$WT = q \times k \times (1-p) \times (f + w \times g) \quad (1.4)$$

Adding up all on average irrelevant and wasted internet traffic in equations 1.1, 1.3 and 1.4, the total irrelevant/wasted traffic (IWT) will be given by:

$$IWT = k \times p \times f + (1-p) \times k \times w \times g + q \times k \times (1-p) \times (f + w \times g)$$

or $$IWT = k \times p \times f + (1-p) \times k \times (w \times g + q \times (f + w \times g))$$

or in a more compact form:

$$IWT = k \times \{p \times f | (1p)((w \times g | q \times (f | w \times g))\} \quad (1.5)$$

Based on the above, it is argued that the system will save internet traffic equivalent to IWT given by equation 1.5. The traffic generated by embodiments of the system itself will be much less than the traffic saved since it would be directed towards the objective of the search (i.e., the human resources); where human resources are represented by contacts only, which is far less in terms of traffic than traditional material resources.

Furthermore, if adopted by current search engines, this system would increase their efficiency by making them avoid producing such unnecessary traffic; caused by users searching for human resources. Such users would then have a proper channel to address their search queries with less cost of search and network throughput. This will make searching for traditional material resources more efficient since the engine would now have less queries and less amount of traffic to communicate (as indicated by equation 1.5). In other words, the system will improve current search engines by decomposing them into two components; one which provides for searching material resources, as normal, while the other provides for searching human resources. The latter would be designed in a way that capitalizes on the nature and characteristics of the resources it is supposed to search (as explained above).

It is also important to note that this taxonomy of human versus material internet resources is unique. It cannot be compared to any other categorizations, like document versus software or sound tracks versus video clips. This is due to the specific characteristics of human resources summarized above; which cannot be attributed to any of the sub-categories of material resources. Therefore, disclosed embodiments achieve far more than merely addressing a problem by arbitrarily dividing it into smaller parts and solving each part alone. The disclosed embodiments tackle a poorly addressed problem by attending to a unique subcategory of internet services; consequently improving its counterpart and thereby increasing the overall efficiency of internet search engines in general.

Embodiments of the disclosed system and method have one or more of the following advantages:

Find other users looking for or interested in similar subjects (based on keywords).
Instant communication between users based on keywords.
Creates "networks of searchers/users" on the fly.
The network structure evolves seamlessly and naturally, with minimal user intervention.
Enables the existence of specific networks of users that would otherwise be very hard to create, such as a community of mothers sharing the experience of certain children syndrome in a particular region.
Creates a way of archiving interests, potentially linking prospective users who might develop the same interest in the future (even if no links currently exist).

In some embodiments, links between users are based purely on keywords, which makes the network topology adaptive and continually reflective of this intention.

In some embodiments, users can manage their own search space (i.e., database record comprising searched keywords) by removing unwanted keywords.

In some embodiments, communication between searchers is allowed only if the common keyword still exists in both search spaces.

In some embodiments, users can filter their fellow searchers/users by time frame, location, online/offline status and other features. For example, when a user selects a time frame of interest, the user can communicate with other searchers/users who used the same keywords within that specific time frame. In other words, if the "Last 24 Hours" time frame is used, then the user would be provided with the list of only those searchers who have searched for (or entered) the same keywords within that specific time frame.

In some embodiments, users can sort their fellow searchers/users by relevance of keywords, time frame, geographical location and other features.

In some embodiments, upon communication, users can like/rate others; e.g., based on the usefulness of their experience in communicating with them with respect to the used keywords.

In some embodiments, users can enable a feature of an embodiment to profile their search (interest) history (referred to in the example as "Profile Me"). This facilitates calculating similarity measures between searchers, which can be used to provide the user with top matches amongst all other users.

In some embodiments, once the database is built, finer levels of information can be incorporated. For example if a user enters a keyword like "US Stock Market," he is allowed to use further reserved "operands" for indicating his level of expertise/interest in the entered keyword. Based on that, he can opt to contact or be contacted only with a specific category of users. Examples of such reserved operands are:

US Stock Market {?}: The user is novice and looking for information.
US Stock Market {i}: The user has (unprofessional/amateur) information.
US Stock Market {p}: The user has professional knowledge.
US Stock Market {a}: The user has academic knowledge.
US Stock Market {b}: The user is a business entity.
US Stock Market {n}: The user is a not-for-profit entity.

Continuing to look at an exemplary embodiment, the system can be logically divided into five main modules. Refer to FIG. 1 for a pictorial depiction:

I. Input Control

This component is a webpage or a mobile application for the user to enter the desired keywords. If the system is used in conjunction with a current search engine, a Widget/Gadget/ActiveX or even a toolbar that is installed on top of the browser could be used. Let's call this component "the control" from here-on-after.

Here, the keywords are saved to the user's profile (along with a timestamp). When the user clicks Locate Searchers in the component, our system looks for similar previously-entered searches and displays the results accordingly.

In case of using the control in conjunction with a search engine, the keywords are grabbed to be processed as above, then released to pursue the normal search process.

II. Output Control

The results include the list of people who have used similar keywords in the specified time frame, location, and the like. ("HRLs"), along with a map of their general location for better visualization, when the user hovers over these points, he can view the details of other users.

III. Chatting Utility

Once a user locates another user, they can communicate using our chatting application, possibly extending that acquaintance outside the system to standard networks, such as Facebook, Twitter, and the like.

IV. Underlying Database

To implement this scenario, a database is maintained with the following fields:

Username (can be her OpenID (Gmail, Yahoo!, Hotmail . . . ) or a new one provided by our service)
Password
City
Province
Country
Used Keywords
Status (Offline/Online/Busy/Away . . . )
Get Connected (If checked, other searchers can communicate with the user, if not, communication can only be initiated by the user)
Ignore Session (Keeps the user connected to others who have searched for the same keywords entered during this session, without adding the keywords to the user's space)
Profile Me (Enables/Disables the Profile Me option described above)

V. User Space

The service creates a "Search Space" for the searcher/user to manage their keywords. This allows the searcher/user to:
delete keywords
archive keywords
export/import keywords to other formats
export searchers list to, e.g., Microsoft Excel®, Microsoft Outlook®, and the like.
Block, e.g., specific searchers, block by country, block by IP, and the like.

The "Search Space" also forms part of the user profile and is stored in a database.

Figure 2A:
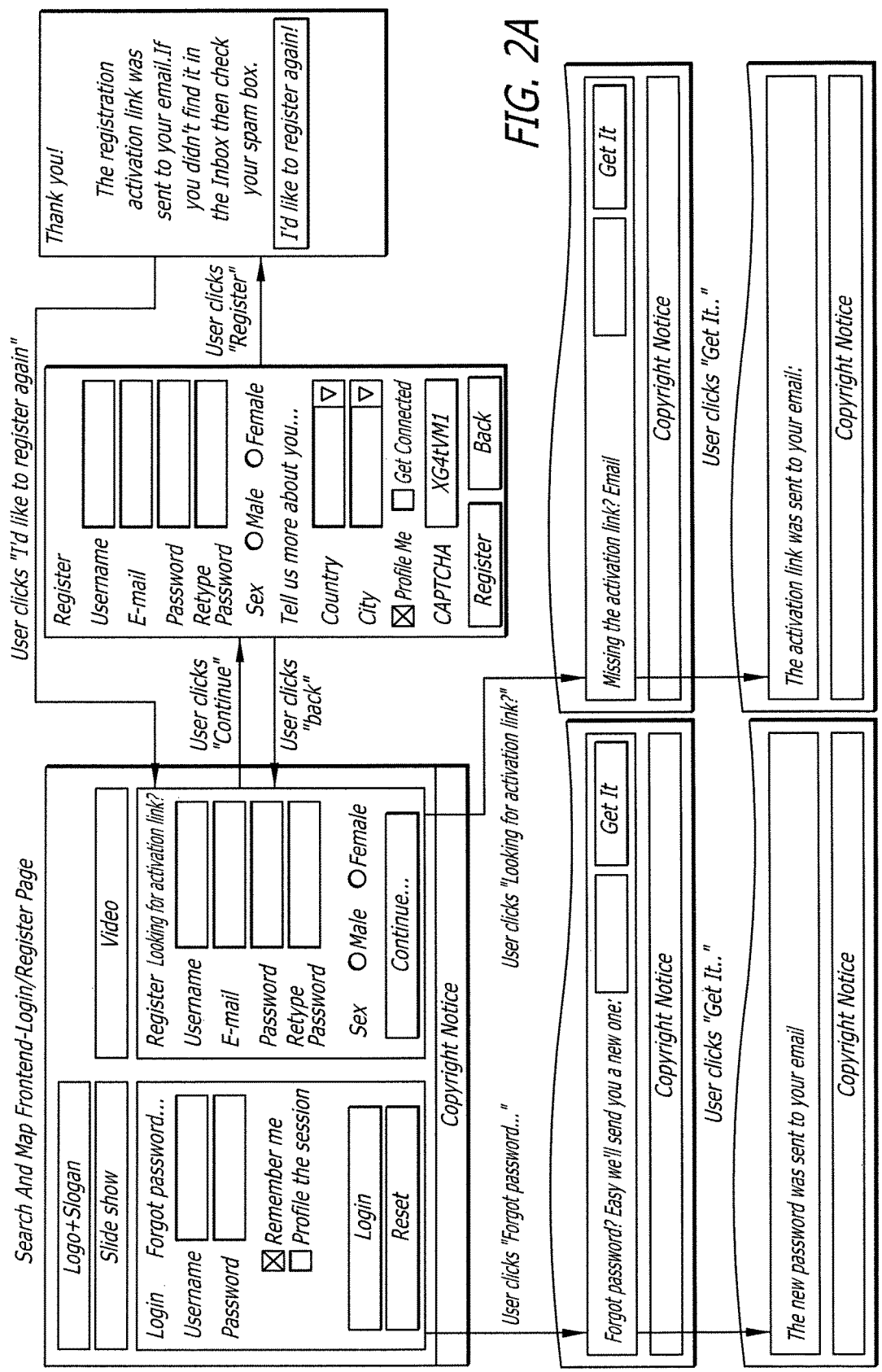
Figure 3:
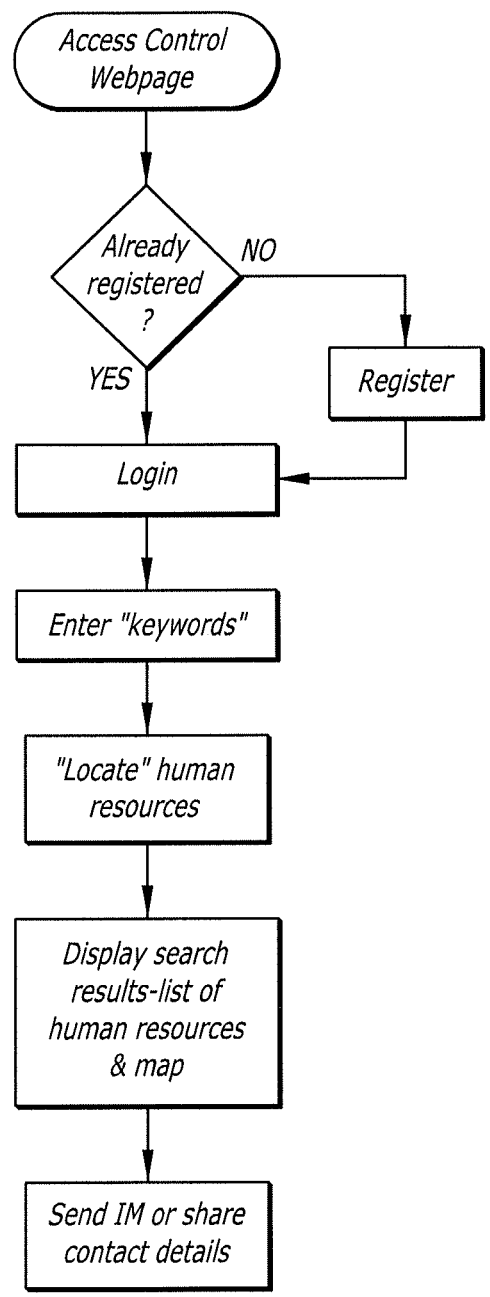
FIG. 3 shows a process flow diagram for a process of using a system in accordance with an embodiment.

Embodiments may be implemented in a number of ways, including, for example, one or more of:
A dedicated website
Integration into existing browsers (for example, integrated into the toolbar of an existing Internet Browser)
Integration into censorship gateways
Integration into a specific search engine
Integration into a specific existing social network service
Integration into a specific mobile/telecommunication service The following, also shown schematically in FIG. 3, is an example flow of steps to make use of a disclosed embodiment:

1. Access the control webpage (or install it, then access it, in case of using the invention in conjunction with existing service; for example, install the control in an Internet Browser). FIG. 2(a) shows an exemplary user interface screen layout for login to/registration with the control webpage.

2. Register for the service by entering the Username, Password, Country, City, Province, Get Connected, Profile Me and other relevant information (see FIG. 2(a)).

3. Enter keywords in the control webpage (see FIG. 2(b)).

Figure 2C:
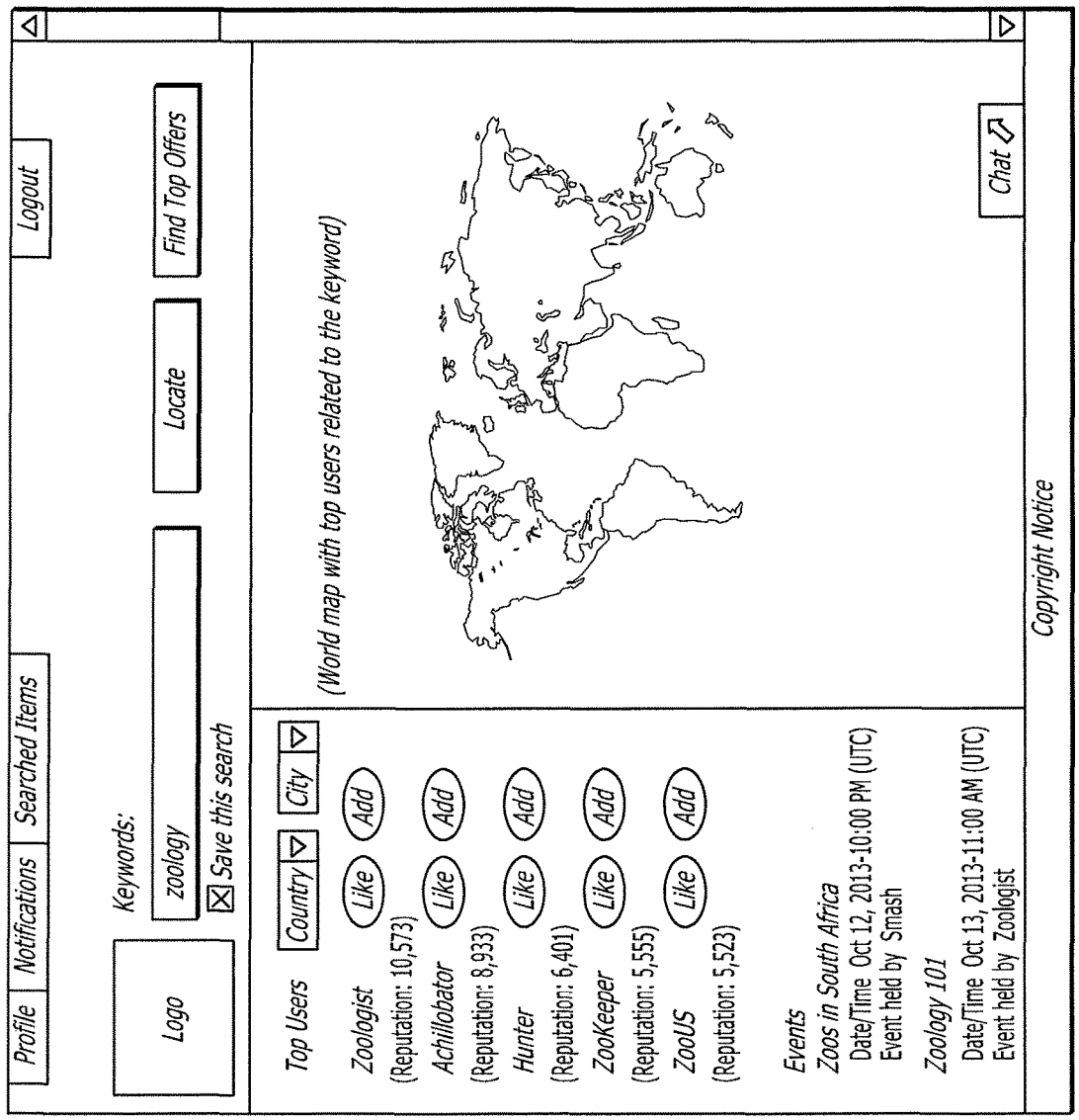

4. Click "Locate"—the application will then display the list of users (i.e. a list of "human resources" or "HRLs") with similar interests in a tabular format together with a map showing where the users are located (see FIG. 2(c)). When the user hovers over these points, relevant information will be displayed.

5. Send instant messages (IMs) using the chatting application to talk and share information about the subject at hand (see FIG. 2(b)), or share contact details to communicate elsewhere (e.g. Facebook®, Twitter®, and the like).

Other features incorporated in some embodiments include:

1. When users chat based on a keyword and exchange Internet resources (URLs), those resources will be stored in the application and tagged by the keyword for later usage.

2. In case any of the users of similar interest is offline, a user can send her an offline message, which she can view once back online again.

3. A user will also be shown a list of trending keywords that other users are actively searching. When clicking on one of them, a list of related users, as described in 4, will be shown.

4. When a first user searches for a novel keyword, where no other users have similar interest related to it, her search query will be saved; and when some other user(s) search for the same keyword later on, the first user will be notified.

5. A user can ask to create a public online event (e.g., a video lecture) related to some keyword through the application, where other users can ask to join this event.

6. When used with search engines (with the user's approval), the system can track URLs visited based on searched keywords. This can be shared with other users as a "suggested solutions" list of URLs.

Figure 4:
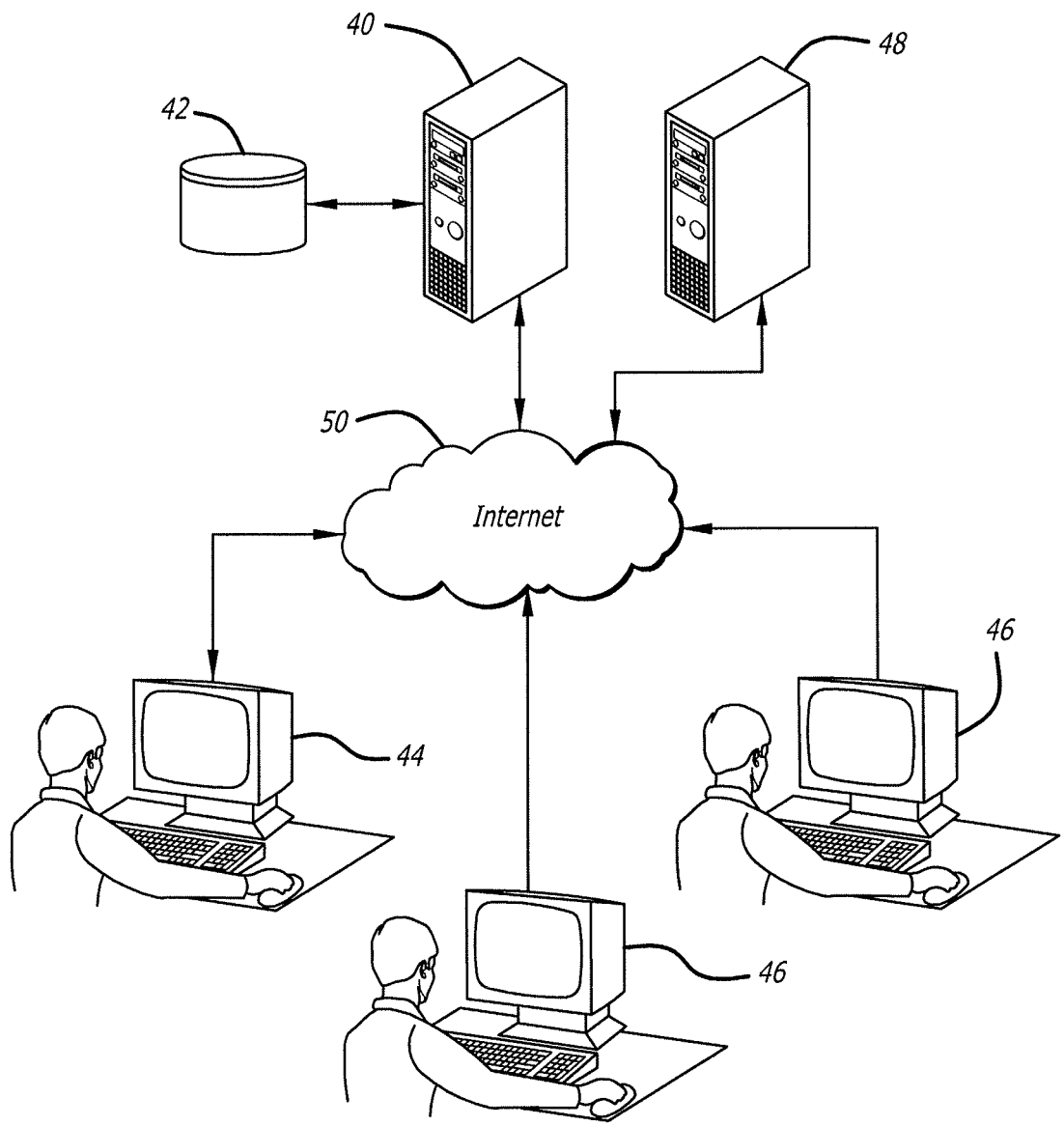
FIG. 4 shows a schematic of a network architecture in which the system of an embodiment can be implemented.

FIG. 4 shows a network architecture in which an embodiment can be implemented. In this example, database 42 stores records for users ("human resources"). Each user record includes keywords that represent topics and fields of interest to the user, along with contact details for the user. The contact details may include one or more of a user name, an email address, an instant message or social network ID, a telephone number or other contact information. Each record preferably also includes a geographical location for the user.

The database 42 is accessed by a search engine application executing on a search server 40. In this example, the server 40 has direct access to the database 42. In other examples the server 40 may access the database 42 via the Internet 50 or other communications network. Users connect to the search server using Internet connected client devices 44, 46.

In this example, a first user accesses the search server from a first client device 44. They query the database 42 in the manner discussed above using one or more keywords. The search results identify two further users who are currently online, using client devices 46, and presents the first user with a list containing the HRLs for these two further users to give the opportunity for the first user to communicate with these other users via the Internet 50. The communication may be effected, for example, via a chat application executing on the same server 40 as the search engine application. Alternatively, communication may be affected by another server 48, which may for example be a third party chat server.

It can be seen from the above that disclosed embodiments make use of the unique taxonomy of human vs. material resources, offering an approach and system that addresses the problem of locating human resources over the Internet in a much more efficient manner than is possible with conventional search engines; for example, offering significant internet traffic and bandwidth savings as demonstrated above.

The skilled person will appreciate that various modifications to the specifically-described embodiment are possible without departing from the spirit and scope of the disclosed embodiments.

What is claimed:

1. A computer implemented method implemented over a network for searching and mapping, the method comprising:
   providing a communications network that enables communication between one or more databases and one or more search servers, wherein the one or more databases comprise a plurality of profiles representing a plurality of Internet searchers registered to a search service and are accessed by search engine applications executed by processors on the one or more search servers;
   providing client devices connected to the one or more search servers via the communications network, wherein the client devices enable the plurality of internet searchers to enter search and map requests and to send entered search and map requests to the one or more search servers when using the internet search service;
   creating a plurality of search spaces representing the plurality of internet searchers, wherein each search space representing a respective internet searcher of the plurality of internet searchers and comprising a respective search request record containing one or more previous search requests of the respective internet searcher, wherein each of the one or more previous search requests including one or more keywords entered by the respective internet searcher when performing a search using the internet search service;
   maintaining the search space as part of a respective profile of the respective internet searcher, and storing each of the plurality of search spaces in the one or more databases;
   receiving a search and map request including one or more keywords identifying one or more internet searchers of the plurality of internet searchers that have previously entered the received one or more keywords in at least one previous search request from a current internet searcher registered to the search service;
   maintaining the received one or more keywords in a search request record of a search space of the current internet searcher, and storing the search space of the current internet searcher in the one or more databases;
   searching the plurality of search spaces in the one or more databases and identify one or more search request records of the one or more internet searchers by matching the received one or more keywords with at least one keyword in the plurality of search spaces;
   creating a search and map virtual network by generating one or more links from the identified one or more search request records of the one or more internet searchers and search request record of the current internet searcher;
   storing the created search and map virtual network in each search space of the one or more internet searchers and current internet searcher in the one or more databases;
   identifying the one or more internet searchers from the identified one or more search request records;
   returning a search result comprising a list of the identified one or more internet searchers;
   displaying the search result along a with a world map of respective location of the identified one or more internet searchers to the current internet searcher;
   creating one or more lists of interests based at least in part on one or more keywords of previous search request records of entered by the internet searchers of the created search and map virtual network;
   storing the one or more list of interests in at least one search space of one or more internet searcher of the created search and map virtual network;
   editing the one or more keywords in the one or more lists of interests by the one more internet searchers in their respective search space;
   automatically updating the one or more links of the created search and map virtual network based on the editing of the one or more lists of interests; and
   dynamically changing a structure of the created search and map virtual network to create a changed search and map virtual network, and updating the at least one search space of one or more internet searcher of the created search and map virtual network, in response to the update of the one or more links; and
   notifying one or more internet searchers of the changed search and map virtual network of the structure change.

2. The method of claim 1, wherein each of the plurality of profiles representing a plurality of internet searchers include contact information, and wherein the search result returned to the current internet search provides the current internet search with an opportunity to contact the plurality of internet searchers using the contact information.

3. The method of claim 1, wherein current internet search has a profile stored in the one or more databases.

4. The method of claim 1, further comprising entering the search and map request from the current internet searcher into an internet browser based search engine for an internet search.

5. The method of claim 1, further comprising notifying one or more internet searchers of the created search and map virtual network that the one or more links have been created.

6. The method of claim 1, wherein the one or more links are removed in the one or more databases between if the associated particular matching keywords are removed.

7. The method of claim 1, further comprising: selecting one or more filters that are applied to the search result.

8. The method of claim 7, wherein at least one of the filters is selected from: geographical location of the internet searchers, time frame within which an internet searcher's matching keyword was created, online/offline status of the plurality of internet searchers.

9. The method of claim 7, wherein application of the one or more filters to the search result means only the search result meeting a criteria of the one or more filters are returned.

10. The method of claim 7, wherein application of the one or more filters to the search result causes the search result to be ranked based on the one or more filters.

11. The method of claim 1, further comprising:
    receiving a new search and map request including one or more keywords from a different internet searcher;

if the new search and map request indicates searching for internet searchers only, searching the one or more databases identifying one or more internet searchers with the one or more keywords in the new search and map request to obtain search result; and if a new search and map request indicates searching for internet searchers and material resources, searching the one or more databases identifying one or more internet searchers with the one or more keywords in the new search and map request and also searching the one or more databases identifying one or more material resources relevant to the one or more keywords in the new search and map request to obtain search result; and returning the search result to the different internet searcher.

12. A networked computer system implemented over a network, the system comprising:

one or more search servers, each of the one or more search servers having a processor;

a communications network that enables communication between one or more databases and the one or more search servers, wherein the one or more databases comprise a plurality of profiles representing a plurality of internet searchers registered to a search service and are accessed by search engine applications executed by processors on the one or more search servers;

client devices connected to the one or more search servers via the communications network, wherein the client devices enable the plurality of internet searchers to enter search and map requests and to send entered search and map requests to the one or more search servers when using the internet search service;

each of the one or more search servers comprising a processor configured to:

create a plurality of search spaces representing the plurality of internet searchers, wherein each search space representing a respective internet searcher of the plurality of internet searchers and comprising a respective search request record containing one or more previous search requests of the respective internet searcher, wherein each of the one or more previous search requests including one or more keywords entered by the respective internet searcher when performing a search using the internet search service;

maintain the search space as part of a respective profile of the respective internet searcher, and storing each of the plurality of search spaces in the one or more databases;

receive a search and map request including one or more keywords identifying one or more internet searchers of the plurality internet searchers that have previously entered the received one or more keywords in at least one previous search request from a current internet searcher registered to the search service;

maintain the received one or more keywords in a search request record of a search space of the current internet searcher, and store the search space of the current internet searcher in the one or more databases;

search the plurality of search spaces in the one or more databases and identify one or more search request records of the one or more internet searchers by matching the received one or more keywords with at least one keyword in the plurality of search spaces;

create a search and map virtual network by generating one or more links from the identified one or more search request records of the one or more internet searchers and search request record of the current internet searcher;

store the created search and map virtual network in each search space of the one or more internet searchers and current internet searcher in the one or more databases;

identify the one or more internet searchers from the identified one or more search request records;

return search result comprising a list of the identified one or more internet searchers;

display the search result along a with a world map of respective location of the identified one or more internet searchers to the current internet searcher;

create one or more lists of interests based at least in part on one or more keywords of previous search request records of entered by the internet searchers of the created search and map virtual network;

store the one or more list of interests in at least one search space of the one or more internet searchers of the created search and map virtual network;

edit the one or more keywords in the one or more lists of interests by the one more internet searcher in their respective search space;

automatically update the one or more links of the created search and map virtual network based on the editing of the one or more lists of interests; and dynamically change a structure of the created search and map virtual network to create a changed search and map virtual network, and update the at least one search space of one or more internet searcher of the created search and map virtual network, in response to the update of the one or more links; and notify one or more internet searchers of the changed search and map virtual network of the structured change.

13. The networked computer system of claim 12, wherein the communications network is the Internet.

14. The networked computer system of claim 13, wherein the client devices are selected from a group consisting of internet connected personal computers, personal digital assistants, set top boxes, games consoles, or smart phones.

15. The networked computer system of claim 12, further comprising a communication server connected to the communications network.

16. The networked computer system of claim 15, wherein the communication server is an email server, a business networking server or a social networking server.

17. The networked computer system of claim 12, further comprising:

an input control module displayed on each client device, via which a user can enter keywords for a search;

an output control module displayed on each client device, via which a user can view search result from a search to identify internet searchers with associated keywords that match keywords they have entered via the input control module.

18. The networked computer system of claim 17, wherein the input control module is a webpage.

19. The networked computer system of claim 17, wherein the input control module is a widget, a gadget, an ActiveX control or a toolbar associated with a browser application.

20. The networked computer system of claim 17, further comprising a chat module.

21. The networked computer system of claim 17, further comprising including a search space in a user space module within which an internet searcher manage respective database record, including managing one or more keywords of one or more previous search request.

* * * * *

UNITED STATES PATENT AND TRADEMARK OFFICE
CERTIFICATE OF CORRECTION

PATENT NO.       : 9,703,873 B2  
APPLICATION NO.  : 13/873042  
DATED            : July 11, 2017  
INVENTOR(S)      : Adnan Fakeih Page 1 of 1

It is certified that error appears in the above-identified patent and that said Letters Patent is hereby corrected as shown below:

In the Claims

Column 13, Line 24:
"of Internet searchers registered to a search service and"
Should read:
--of internet searchers registered to a search service and--.

Column 14, Line 8:
"displaying the search result along a with a world map of"
Should read:
--displaying the search result along with a world map of--.

Column 16, Line 12:
"displaying the search result along a with a world map of"
Should read:
--displaying the search result along with a world map of--.

Column 16, Line 23:
"of interests by the one more internet searchers of"
Should read:
--of interests by the one or more internet searchers of--.

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*